US008521520B2

(12) United States Patent
Zinser et al.

(10) Patent No.: US 8,521,520 B2
(45) Date of Patent: Aug. 27, 2013

(54) HANDOFFS BETWEEN DIFFERENT VOICE ENCODER SYSTEMS

(75) Inventors: Richard Louis Zinser, Niskayuna, NY (US); Michael James Hartman, Clifton Park, NY (US); John Erik Hershey, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 737 days.

(21) Appl. No.: 12/699,699

(22) Filed: Feb. 3, 2010

(65) Prior Publication Data

US 2011/0189994 A1 Aug. 4, 2011

(51) Int. Cl.
*G10L 11/00* (2006.01)
*G10L 19/12* (2006.01)
*G10L 19/00* (2006.01)
*G10L 21/04* (2006.01)
*H04W 4/00* (2009.01)

(52) U.S. Cl.
USPC ........... 704/221; 704/200; 704/211; 704/220; 704/500; 704/503; 370/338; 370/331

(58) Field of Classification Search
USPC ................. 704/200, 221, 211, 500; 370/338, 370/331
See application file for complete search history.

(56) References Cited

U.S. PATENT DOCUMENTS

| 5,903,862 | A | * | 5/1999 | Weaver et al. ................ 704/212 |
| 5,995,923 | A | * | 11/1999 | Mermelstein et al. ........ 704/219 |
| 6,055,275 | A | * | 4/2000 | Pinier et al. .................... 375/244 |
| 6,678,654 | B2 | | 1/2004 | Zinser, Jr. et al. |
| 6,829,579 | B2 | * | 12/2004 | Jabri et al. ..................... 704/221 |
| 7,106,799 | B1 | * | 9/2006 | Sostawa et al. .......... 375/240.24 |
| 7,715,365 | B2 | * | 5/2010 | Yoon et al. ..................... 370/352 |
| 2005/0015243 | A1 | * | 1/2005 | Lee et al. ....................... 704/219 |
| 2005/0159943 | A1 | * | 7/2005 | Zinser et al. ................... 704/219 |
| 2007/0088545 | A1 | | 4/2007 | Zinser, Jr. et al. |
| 2007/0094018 | A1 | | 4/2007 | Zinser, Jr. et al. |
| 2007/0299659 | A1 | * | 12/2007 | Chamberlain ................ 704/219 |
| 2008/0031275 | A1 | * | 2/2008 | Janky et al. ................... 370/466 |

(Continued)

FOREIGN PATENT DOCUMENTS

| EP | 2144230 A1 | | 1/2010 |
| WO | 03/058407 A2 | | 4/2003 |
| WO | WO 2010003564 A1 | * | 1/2010 |

OTHER PUBLICATIONS

Kang, Hong-Goo; Hong Kook Kim; Cox, R.V., "Improving transcoding capability of speech coders in clean and frame erasured channel environments," Speech Coding, 2000. Proceedings. 2000 IEEE Workshop on , vol., No., pp. 78,80, 2000.*

(Continued)

*Primary Examiner* — Paras D Shah
(74) *Attorney, Agent, or Firm* — Jean Testa; Fletcher Yoder

(57) ABSTRACT

Provided are methods and systems of managing handoffs in a wireless communication system having different types of vocoders. Some embodiments include translating state memory of a first vocoder to a second vocoder using a state memory transcoder. The state memory may be delayed to align differences in algorithmic delays between the first vocoder and the second vocoder. In one embodiment, a speech signal may be decoded from the first vocoder, delayed, and encoded to the second vocoder. Furthermore, for a period of time during and/or adjacent to the handoff, the first vocoder may output with decreasing amplitude while the second vocoder outputs with increasing amplitude. Such techniques may be used alone or in combination.

22 Claims, 3 Drawing Sheets

(56) References Cited

U.S. PATENT DOCUMENTS

| | | |
|---|---|---|
| 2008/0059159 A1* | 3/2008 | Komaili et al. ............... 704/221 |
| 2008/0260048 A1* | 10/2008 | Oomen et al. ................ 375/241 |
| 2008/0306732 A1* | 12/2008 | Ghenania et al. ............. 704/219 |
| 2009/0209255 A1 | 8/2009 | Lassers et al. |
| 2010/0223053 A1* | 9/2010 | Sandgren et al. ............. 704/219 |

OTHER PUBLICATIONS

Unofficial English translation of KR Office Action dated Mar. 28, 2012 from corresponding KR application No. 2011-0009998.
EP Search Report dated Jul. 26, 2012 from corresponding EP Applicatton No. 11152533.3.

* cited by examiner

HANDOFFS BETWEEN DIFFERENT VOICE ENCODER SYSTEMS

BACKGROUND

The subject matter disclosed herein relates to communication systems, and more particularly, to systems and methods of conducting handoffs between voice encoders in a communication system.

A communication system may include devices capable of transmitting and receiving human speech. For example, a user may speak into a first communication device, and the speech waveform may be compressed and digitized and then transmitted to a second communication device. The compressed digital signal may be decompressed to reconstruct an approximation of the original speech waveform. The compression and decompression of speech signals in a communication system may involve voice encoders, commonly referred to as "vocoders."

During a communication, users may communicate via communication devices which are linked to network nodes which may be connected within a communication network. The connection between a communication device and a particular network node may depend on signal quality parameters between the device and the node. As signal quality parameters may change during a communication, connection between a device and a node may sometimes be switched to maintain an acceptable signal quality. For example, a connection between a communication device and a first network node may be switched to enable a communication between the device and a second network node for improved signal quality. Such a switch in communication between device and network node may be referred to as a "handoff."

Handoffs may occur substantially seamlessly when a communication device is switching from communicating with one network node using one type of vocoder to another network node using the same type of vocoder, as the architectures of the two vocoders may be similar, and the frames of the two like vocoders may be aligned in time. However, as communication systems have evolved, the number of different link layer technologies in a communication network has increased, potentially complicating the handoff process between different communication devices and different network nodes, as different communication technologies may use different types of vocoders for coding and decoding speech signals. Different vocoders may have different architectures with incompatible bit streams, different frame sizes, or different algorithmic delays, which decrease the likelihood of accomplishing an acceptable (e.g., substantially undetectable) handover. Thus, a more seamless method of performing a handoff in a communication system having different vocoders may improve communication quality.

BRIEF DESCRIPTION

One embodiment includes a method for switching between a first vocoder and a second vocoder in a communication network. The method includes translating the state memory of the first vocoder to the state memory of the second vocoder, using a state memory transcoder and time-delaying the state memory in the second vocoder based on an algorithmic delay of the second vocoder.

Another embodiment provides a method of managing a handoff between incompatible vocoders. The method includes decoding a bit stream from a first vocoder to generate a speech signal, delaying the speech signal according to an algorithmic delay of a second vocoder to generate an aligned speech signal, and encoding the aligned speech signal according to transmission parameters of a second vocoder. The encoded aligned signal is then decoded and used to fill the state memory in the second vocoder.

Yet another embodiment includes a communication system including one or more communication devices and state memory transcoders. The communication device is configured to communicate with a first vocoder and a second vocoder in the system. The device is also configured to conduct a handoff between a communication with the first vocoder and a communication with the second vocoder. The state memory transcoder is configured to translate the memory of the first vocoder to the memory of the second vocoder in the state domain.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In a communication network, a device may communicate with other devices in the network by connecting to the network via links with one or more network nodes. The network node may be linked to controllers or gateways, which may be linked to a common communications medium. For example, a communication between two communicating devices in a network may include a path of links connecting two devices. A "link" may refer to a communication path, a connection, or a transferred signal, etc., between a communication device, a network node, or a controller in the network. A processor in the communication network may link the communication device to a particular network node based on which network node is suitable for providing the best signal strength in linking with the device. During the duration of the communication, the signal strength between a communication device and a network node may change. To maintain a communication having acceptable signal qualities, the processor may link the communication device to a different network node. It may be desirable for such a transfer, referred to as a switch in communication or a "handoff," to occur with relatively little delay, such that the handoff may be substantially unnoticeable to a user of the communication device during the communication.

Figure 1:
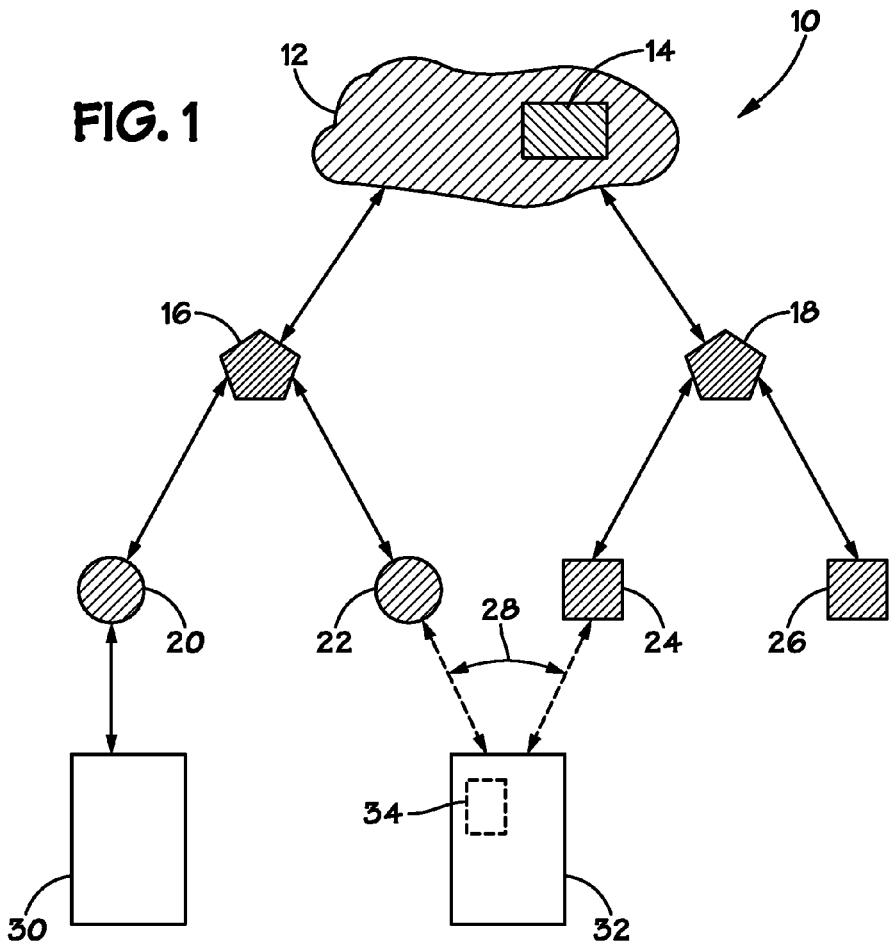
FIG. 1 depicts a handoff occurring in a portion of a communication network, in accordance with embodiments of the present invention.

A diagram depicting a handoff in a communication network 10 is illustrated in FIG. 1. The network 10 may include a common communications medium 12, which may be the common medium linking all the communication devices in the network 10. While the illustrated portion of a network 10 is used to explain one embodiment of the present invention, embodiments of managing handoffs between different types of vocoders may be implemented between different networks and may include various other devices (e.g., different types of communication devices, network nodes, and controllers) which may not all be illustrated in the network 10.

In the network 10, one or more controllers 16 and 18 may be linked to the medium 12 and may serve as a gateway for network nodes. For example, one or more network nodes, such as base stations 20 and 22 may be linked to the base station controller 16, and likewise, one or more network nodes, such as access points 24 and 26 may be linked to the access point controller 18. The network nodes (e.g., 20, 22, 24, and 26) may then have links to various communication devices. For example, a first communication device 30 may be linked to a base station 20, and a second communication device 32 may be linked to an access point 24.

The network 10 may also include a processor 14 which may be accessible by one or more devices in the network 10. For example, the processor 14 may be coupled to one or more controllers in the network 10, and in some embodiments, the processor 14 may be coupled directly to network nodes or communication devices. The processor 14 may determine signal quality parameters in the links in a network 10, and may also conduct handoffs based on an analysis of signal quality parameters. In some embodiments, the processor 14 may also manage vocoding and/or transcoding processes, which will be further explained. For example, the processor 14 may control an output of vocoders in the network 10, and may initiate a transcoder in the network 10 to transfer information between vocoders during a handoff. As will also be explained, the network 10 may include a transcoder 34 which may be located in a communication device 32 in the network 10. In some embodiments, the transcoder 34 may also be in a network node (e.g., network nodes 20, 22, 24, or 26) or in some other device in the network 10. Further, in some embodiments, the transcoder may be controlled by any suitable processor 14 in the network 10, and may be remotely programmable.

As wireless communication networks have developed, different types of network nodes (base stations 20 and 22, access points 24 and 26, etc.) may be linked with different types of communication devices (mobile phones, laptop computers, etc.), and handoffs may be made by transferring the link between a communication device (e.g., device 32) with one network node (e.g., access point 24) to another network node (e.g., base station 22). As will be further discussed, such a handoff 28 may be comparatively more complicated, as the handoff is occurring between two different types of access technologies.

A handoff may involve coding and decoding (i.e., compressing and decompressing, respectively) human speech such that a speech signal may be digitally transmitted from a first communication device, and a re-synthesized approximation of the original speech may be received at a second communication device. The coding and decoding process may involve compressing a speech signal to generate a digital representation of the speech signal, storing the digital representation in memory, and transmitting the digital representation to a receiving device to be decompressed into the approximation of the original speech signal. Such digital compression techniques may be common in communication systems, as the digital representations of speech signals may be substantially more compact than the original speech signals. Compact digital representations may be more efficiently stored and transmitted, and may be easier to process.

The compression and decompression of speech signals may be performed by voice encoders (i.e., vocoders) which extract parameters of successive sets of a speech signal (referred to as "frames"), map the extracted parameters onto a mathematical model of the human vocal tract to produce the digital signal, and store, transmit, output, and/or provide the digital signal to a receiving device in a communication network. A vocoder of the receiving device may decompress the digital signal, using the encoded extracted parameters of the original speech signal to reconstruct an approximation of the original speech signal. A vocoder may have a memory architecture which stores various intermediate states of the compressed speech signal. For example, a vocoder may contain one or more signals or states, including, for example, all-pole linear prediction coding (LPC) synthesis filter state buffer, long term memory (e.g., pitch predictor), pointers into memory or counters representing pitch periods, and previous frame decoded synthesis coefficients or pointers for interpolation.

Speech signals may be transmitted in various types of communication, including cellular systems, personal communications service ("PCS") systems, voice over internet protocol ("VoIP") systems, etc. Such a heterogeneous communication network of different communication systems may include different system architectures, which may each involve different vocoders for compressing and decompressing speech signals. However, when a handoff is made in a communication between two different systems (and two different vocoders), the communication may experience delays due to the incompatibility of the two vocoders. "Incompatible vocoders" may refer to vocoders having different architectures for speech synthesis and incompatible bit streams. Incompatible vocoders may also use different frame sizes for compressing and decompressing speech signals, and may have different algorithmic delays. Thus, when a handoff is made between incompatible vocoders, the memory buffer of one vocoder may not be simply copied directly into the memory buffer of another due to the different memory architectures. Additionally, due to different internal algorithmic delays in both the analysis and synthesis of speech signals, the output signals may be misaligned in time during a handoff between incompatible vocoders, which may result in gaps in communication or communication loss.

Present embodiments include a method for reducing the adverse effects of handoffs between incompatible vocoders in a network 10. Some embodiments involve translating state memory from one vocoder to another using a transcoder suitable for translating a first vocoder's state memory from one algorithm to the algorithm of a second vocoder's state memory. In one embodiment, an improved handover may be performed between incompatible vocoders by matching the algorithmic delays in the vocoders, which may involve decoding a first vocoder's bit stream into a speech signal, applying a suitable time-alignment delay, re-encoding the time-delayed signal according to a second vocoder's transmission parameters, and decoding the re-encoded signal to the second vocoder's state memory. Further, one or more embodiments involve operating two incompatible vocoders during a handoff for a period of time in a fadeover switch. The fadeover switch may involve fading out the output of a first vocoder while fading in the output of a second vocoder, such that missing data transfers or delays may be less perceptible. Any of these embodiments may be used singly or in combination.

Figure 2:
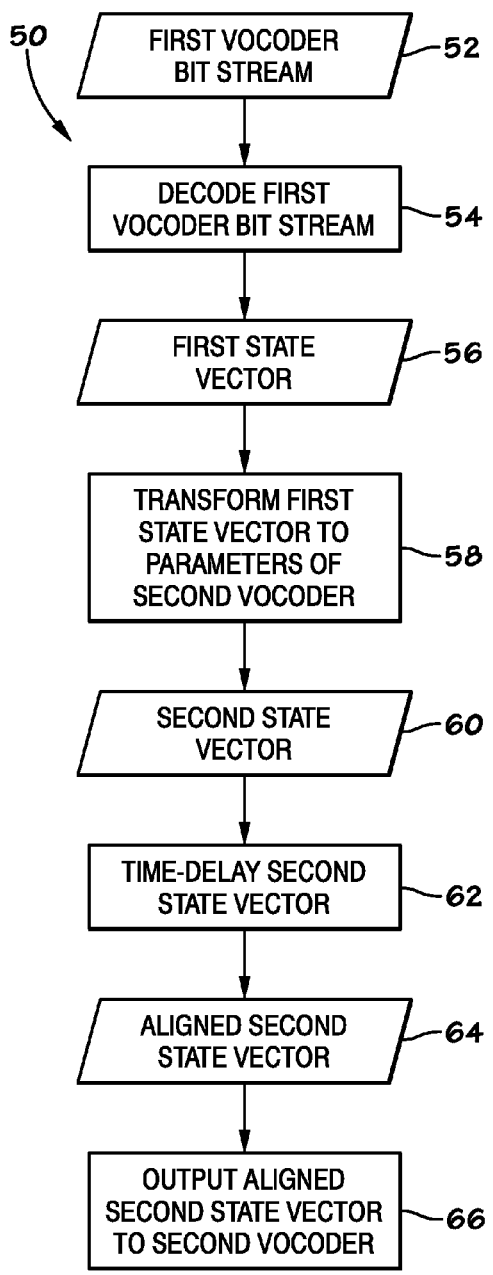
FIG. 2 is a flow chart of a state memory transcoder process for conducting a handoff between incompatible vocoders, in accordance with embodiments of the present invention.

A process 50 for using a state memory transcoder to translate state memory from a first vocoder to a second vocoder is presented in the flow chart of FIG. 2. A state memory transcoder may differ from previous transcoder implementations, which typically involved converting an encoded bit stream of a first vocoder to a different coding standard (e.g., conversions between linear predictive coding (LPC), mixed-excitation linear prediction (MELP), and time domain voicing cutoff (TDVC) standards). However, in the transcoding process 50 of the present invention, a state memory transcoder may be implemented to translate the state memory of the first vocoder into the state memory algorithm of the second vocoder. In some embodiments, translating the state memory algorithms between vocoders may be more efficient and/or less complicated than converting between different bit stream coding standards.

In the state memory transcoding process 50, the bit stream 52 from one type of vocoder, referred to as the first vocoder, may be received at a transcoder suitable for translating between different state memory algorithms. The transcoder may decode (block 54) the bit stream of the first vocoder (referred to as the first vocoder bit stream 52) into a speech signal. This process fills the state memory of the first vocoder. The state memory of the first vocoder bit stream, referred to as the first state vector 56, may be a multi-dimensional vector array derived from the first vocoder bit stream, and may have between 20 to 50 numbers. The transcoder may transform (block 58) the first state vector array into a format compatible with a different type of vocoder (referred to as the second vocoder). The transformed second state vector 60 may also be a multi-dimensional vector array representing the first bit stream 52, and may have a different size compared to the first state vector 56. For example, the second state vector may have between 35 to 40 discrete numbers.

The transcoding process 50 may then involve time-delaying (block 62) the second state vector 60 to match the algorithmic delays of the second vocoder. As previously discussed, different types of vocoders (i.e., incompatible vocoders) may have different algorithmic delays, and delaying the transferred vector 60 may align the vector 60 with the algorithmic delays of the receiving second vocoder. The aligned second state vector 64 may then be output (block 66) from the state memory transcoder to the second vocoder. The aligned second state vector 64 may have a vector size and delay suitable for the memory architecture of the second vocoder. The second vocoder may then employ the aligned second state vector 64 to reconstruct an approximation of the original speech signal. In some embodiments, the state memory transcoding process 50 may be performed by a programmable computing element such as a microprocessor or a field programmable gate array (FPGA). The transcoding process 50 may be programmed remotely by transmitting transcoding instructions, such as part or all of the code for performing the state memory transcoding process 50, to a suitable programmable computing element (e.g., processor 14) in the network 10. Thus, in some embodiments, links in the network 10 may transmit packets including code for performing a state memory transcoding process, as well as digitized voice information.

Figure 3:
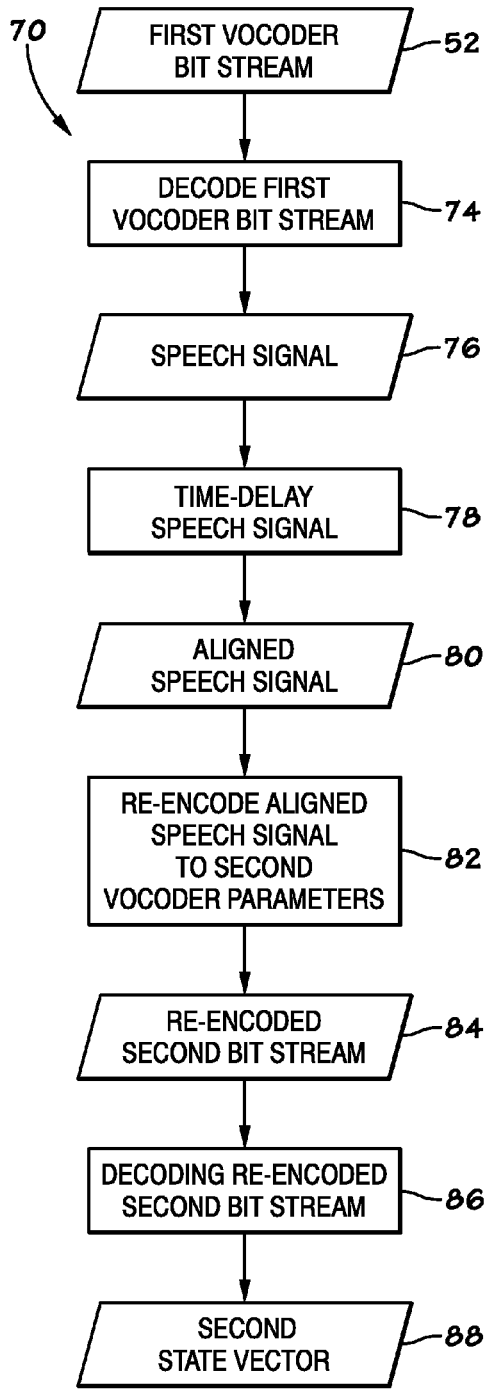
FIG. 3 is a flow chart of a memory fill process for conducting a handoff between incompatible vocoders, in accordance with embodiments of the present invention.

In some embodiments, a handoff between incompatible vocoders may also be improved by applying a time delay to a first decoded speech signal, encoding the signal according to the second vocoder's transmission parameters, and decoding the encoded signal to fill the second vocoder's state memory. This process, referred to as a memory fill process 70, is depicted in FIG. 3. The memory fill process 70 may involve decoding (block 74) the bit stream from a first vocoder (referred to as the first vocoder bit stream 52) into a speech signal 76. As the first vocoder may have a different delay algorithm than another vocoder of the handoff process, the speech signal 76 may be time-delayed (block 78), and the aligned speech signal 80 may be re-encoded (block 82) according to the transmission parameters of a second vocoder. The re-encoded bit stream may be referred to as the re-encoded second bit stream 84, as the aligned speech signal has been encoded according to the parameters of the second vocoder. The re-encoded second bit stream 84 may then be decoded (block 86) into a speech signal. The decoding process fills the state memory of the second vocoder, producing state vector 88.

Figure 4:
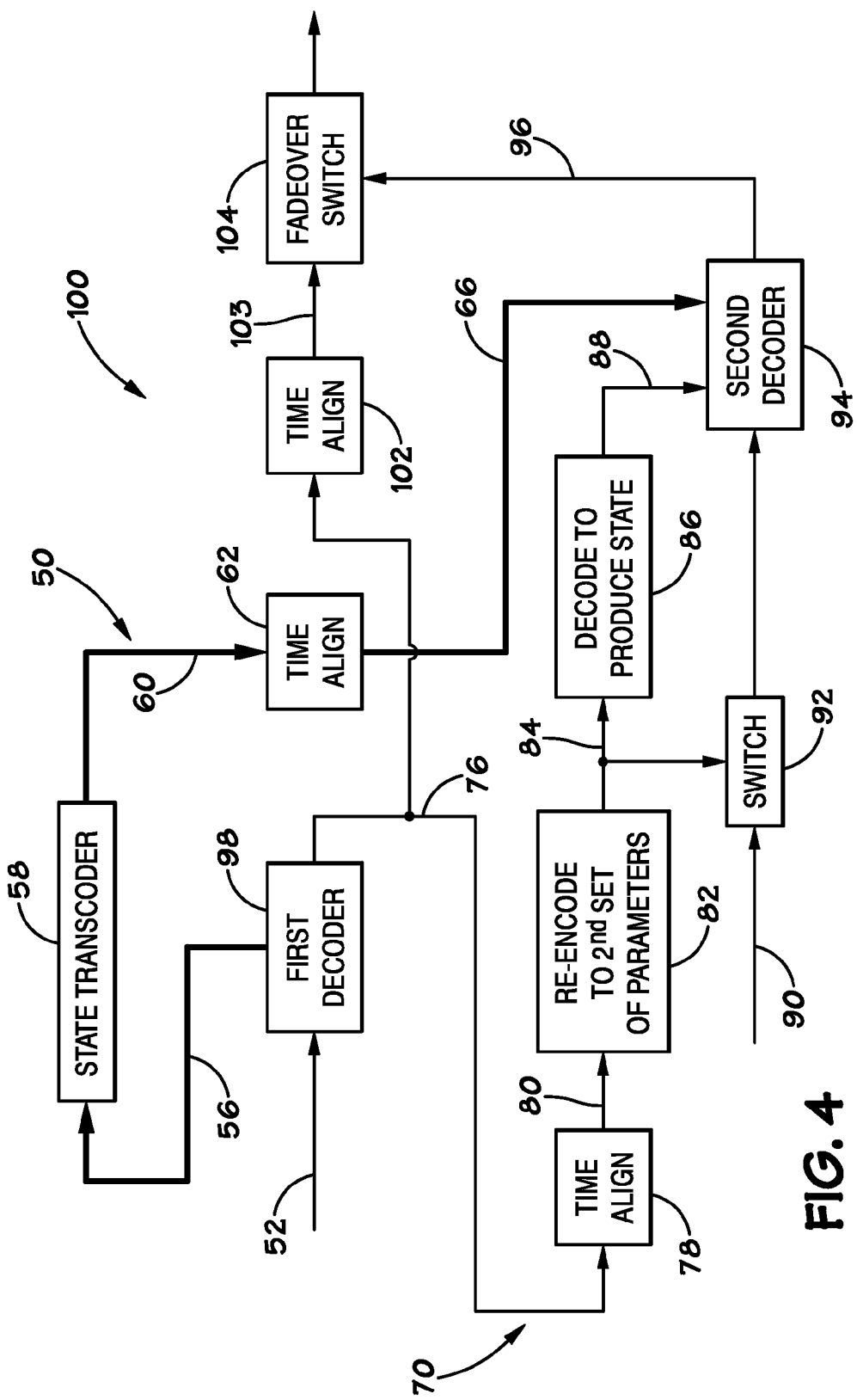
FIG. 4 is a flow chart of a combined incompatible vocoder handoff method, in accordance with embodiments of the present invention.

As illustrated in FIG. 4, the state memory transcoder process 50 and the memory fill process 70 may each be used alone, or in conjunction with other methods for conducting handoffs between incompatible vocoders. The steps and outputs for each of the processes 50 and 70 are labeled in the combined incompatible vocoder handoff combined process 100, and the process path of the state memory transcoder process 50 is bolded.

The outputs 66 and 88 of the processes 50 and 70 (respectively) are supplied as state vector inputs to the second decoder 94. The second decoder 94 may decode a bitstream formatted according to the second vocoder's transmission parameters, using the supplied state vector inputs 66 and 88. The bitstream input for the decoder 94 may be selected by a switch 92. In some embodiments, the switch 92 may select the re-encoded bit stream 84 during the initial phase of the handoff process, and then select the second vocoder bit stream 90 when the received format changes during the handoff. The output of the decoder 94 is supplied as an input to fadeover switch 104.

The fadeover switch 104 may involve overlapping the operation of the first vocoder and the second vocoder for some period of time during and/or after the handoff, such that the output of the first vocoder decreases in amplitude and overlaps with the output of the second vocoder which increases in amplitude. Time-delaying (block 102) the output of the first vocoder may also be useful in preventing gaps or improper frame alignment. The delayed output 103 is also supplied as an input to switch 104.

Figure 5:
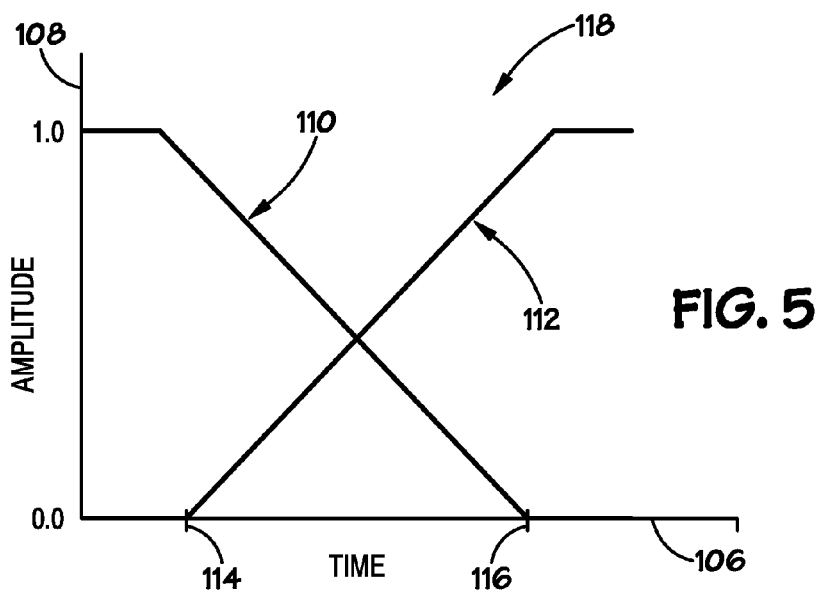
FIG. 5 illustrates a graph depicting a fadeover switch employed in a handoff, in accordance with embodiments of the present invention.

The fadeover switch 104 concept may be better illustrated in the graph 118 of FIG. 5, which illustrates the amplitude 108 through time 106. The first vocoder output signal 103 (from FIG. 4) may be scaled by amplitude and represented in the graph 118 as the first plot 110, while the second vocoder output signal 96 (from FIG. 4) may be scaled by amplitude and represented as the second plot 112. The graph 118 may depict the amplitudes of the first plot 110 and the second plot 112 during a handoff between two vocoders. As a handoff typically may take one or more vocoder frames, an overlap in the output amplitudes 110 and 112 of the two vocoders may decrease the perceptibility of gaps or other transient artifacts during the communication. In some embodiments, after the second vocoder has had sufficient time (e.g., one or more speech frames) to align the second vocoder state memory with the state memory of the first vocoder, the handoff between the first and second vocoder may be completed.

At the completion of a handoff, the first decoder may typically cease to output the decoded speech from the first vocoder, and the second decoder may begin to output the decoded speech from the second vocoder. In one or more embodiments, a fadeover switch may be employed to combine the first decoder output 103 with the second decoder output 96 using, for example, the amplitude plots 110 and 112. During and/or after a handoff, between approximately times 114 and 116 on the graph 118, the fadeover switch may decrease the output of the first vocoder according to the plot 110 while concurrently increasing the output of the second vocoder according to the plot 112. The decreasing and increasing characteristics of amplitudes 110 and 112, respectively, may be accomplished by, for example, multiplying the first vocoder output with a time-decaying window and multiplying the second vocoder output with a mirror image of the same window. Thus, the decreasing first vocoder output and the increasing second vocoder output may be summed to provide a less perceptible transition between the two vocoder signals.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for switching between a first vocoder and a second vocoder, the method comprising:
    translating a first state memory filled by a decoded bitstream of the first vocoder to a second state memory of the second vocoder, using a state memory transcoder; and
    delaying the contents of the second state memory based on an algorithmic delay of the second vocoder by time-delaying the second state memory to match the algorithmic delay of the second vocoder, where the second vocoder comprises a vocoder selected from a plurality of vocoder types, wherein each of the plurality of vocoder types has a different algorithmic delay based on an internal delay of analysis and synthesis of speech signals.

2. The method of claim 1, wherein the first state memory and the second state memory each comprise a multi-dimensional vector, and wherein the multi-dimensional vector of the first state memory is a different format from the multi-dimensional vector of the second state memory.

3. The method of claim 1, comprising:
    decoding a first bit stream of the first vocoder into a speech signal; and
    delaying the speech signal to align an algorithmic delay of the first vocoder with the algorithmic delay of the second vocoder.

4. The method of claim 3, comprising:
    encoding the delayed speech signal based on one or more transmission parameters of the second vocoder to generate a second bit stream;
    decoding the second bit stream to generate a second state memory; and
    storing the second state memory in the second vocoder.

5. The method of claim 1, comprising concurrently operating the first vocoder and the second vocoder for a time period during and/or adjacent to the switching between the first vocoder and the second vocoder.

6. The method of claim 5, wherein concurrently operating comprises decreasing an amplitude of a first output of the first vocoder while increasing an amplitude of a second output of the second vocoder.

7. The method of claim 6, wherein the decrease in amplitude of the first output substantially mirrors the increase in amplitude of the second output.

8. The method of claim 5, wherein the first vocoder is not operating after the time period.

9. A method of managing a handoff between incompatible vocoders, the method comprising:
    decoding a first bit stream at a first vocoder to generate a speech signal in a state memory filled by a decoded bitstream;
    delaying the speech signal according to an algorithmic delay of a second vocoder to generate an aligned signal by time-delaying the state memory to match the algorithmic delay of the second vocoder, where the second vocoder comprises a vocoder selected from a plurality of vocoder types, wherein each of the plurality of vocoder types has a different algorithmic delay based on an internal delay of analysis and synthesis of speech signals;
    encoding the aligned signal according to transmission parameters of a second vocoder to generate an encoded aligned signal; and
    decoding the encoded aligned signal to fill a state memory of the second vocoder.

10. The method of claim 9, comprising encoding an original speech signal into the first bit stream at the first vocoder, wherein the speech signal is substantially similar to the original speech signal.

11. The method of claim 9, comprising operating the first vocoder and the second vocoder concurrently for a time period adjacent to the handoff.

12. The method of claim 9, comprising:
    decoding the first bit stream to generate a first state memory vector; and
    transforming the first state memory vector to a second state memory vector based on transmission parameters of the second vocoder; and
    delaying the second state memory vector to match algorithmic delays of the first vocoder and the second vocoder.

13. The method of claim 12, wherein transforming the first state memory vector to the second state memory vector is performed using a state memory vector transcoder.

14. A communication system comprising:
    a communication device configured to communicate with a first vocoder and a second vocoder and configured to conduct a handoff between a communication with the first vocoder and a communication with the second vocoder; and
    a state vector memory transcoder configured to translate a first state memory filled by a decoded bitstream of the first vocoder to a second state memory of the second vocoder in a state domain; and
    a processor configured to time align one or more of the first state memory and the second state memory based on one or more of an algorithmic delay associated with the first vocoder and an algorithmic delay associated with the second vocoder wherein aligning the first and second state memory based on the algorithmic delay of the second vocoder comprises time-delaying the second state memory to match the algorithmic delay of the second vocoder, where the second vocoder comprises a vocoder selected from a plurality of vocoder types, wherein each of the plurality of vocoder types has a different algorithmic delay based on an internal delay of analysis and synthesis of speech signals.

15. The system of claim 14, wherein the processor is configured to manage the communications between the communication device, the first vocoder, and the second vocoder.

16. The system of claim 14, wherein the processor is configured to manage an operation of the first vocoder and an operation of the second vocoder.

17. The system of claim 16, wherein the processor is configured to overlap the operation of the first vocoder and the operation of the second vocoder for a time period during and adjacent to the handoff.

18. The system of claim 17, wherein the processor is configured to decrease an output of the first vocoder and increase an output of the second vocoder during the time period.

19. The system of claim 14, wherein the processor is configured to time align a speech signal based on one or more of a delay associated with the first vocoder and a delay associated with the second vocoder.

20. The system of claim 14, wherein the first vocoder comprises one or more of a different memory architecture, a different frame size, and a different algorithmic delay compared to the second vocoder.

21. The system of claim 14, wherein the first communication device is configured to transmit a speech waveform or receive a re-synthesized speech waveform from one or more of the first vocoder and the second vocoder.

22. The system of claim 14 wherein the state memory transcoder is remotely programmable.

\* \* \* \* \*